United States Patent
Wallace et al.

(10) Patent No.: US 11,930,966 B1
(45) Date of Patent: Mar. 19, 2024

(54) BLENDER INCLUDING AN INTEGRATED SMART SCALE AND A RECIPE APPLICATION

(71) Applicant: Perfect Company, Vancouver, WA (US)

(72) Inventors: Michael Wayne Wallace, Vancouver, WA (US); Philip Trevor Odom, Portland, OR (US)

(73) Assignee: Perfect Company, Vancouver, WA (US)

( * ) Notice: Subject to any disclaimer, the term of this patent is extended or adjusted under 35 U.S.C. 154(b) by 568 days.

(21) Appl. No.: 15/675,449

(22) Filed: Aug. 11, 2017

(51) Int. Cl.
| | |
|---|---|
| B01F 15/00 | (2006.01) |
| A47J 43/07 | (2006.01) |
| B01F 7/16 | (2006.01) |
| B01F 7/20 | (2006.01) |
| B01F 13/10 | (2006.01) |
| G01G 19/52 | (2006.01) |
| G06F 3/048 | (2013.01) |

(52) U.S. Cl.
CPC ....... *A47J 43/0722* (2013.01); *A47J 43/0727* (2013.01); *G01G 19/52* (2013.01); *G06F 3/048* (2013.01)

(58) Field of Classification Search
CPC .............. A47J 2043/0733; A47J 43/046; A47J 43/0716; A47J 43/0722; A47J 43/0727; G01G 19/52
See application file for complete search history.

(56) References Cited

U.S. PATENT DOCUMENTS

| | | | | |
|---|---|---|---|---|
| 8,616,248 | B2 * | 12/2013 | Herbert | A23G 9/045 |
| | | | | 141/103 |
| 2016/0256003 | A1 * | 9/2016 | Altenritter | A47J 43/046 |
| 2017/0325621 | A1 * | 11/2017 | Herbert | A47J 31/52 |
| 2018/0073915 | A1 * | 3/2018 | Finnance | A47J 43/046 |

* cited by examiner

*Primary Examiner* — Elizabeth Insler
(74) *Attorney, Agent, or Firm* — Rylander & Associates, PC; Philip R. M. Hunt

(57) ABSTRACT

A blender includes an integrated scale used to weigh ingredients added to a vessel of the blender. The blender also includes a user interface (UI) and a recipe application that includes recipe data. The integrated scale is mounted atop the blender such that as the vessel receives ingredients, the vessel engages the integrated scale but does not operatively engage a motor of the blender when weighing ingredients. The weights may be provided to a user via the UI as the ingredients are received in the vessel. The recipe application may be executed by a microcontroller of the blender to provide recipe steps via the UI to the user and thereby guide the user through a recipe based at least in part upon the recipe data and the weight of ingredients. When blending and mixing the ingredients, the vessel operatively engages the motor but does not engage the integrated scale.

18 Claims, 10 Drawing Sheets

BLENDER INCLUDING AN INTEGRATED SMART SCALE AND A RECIPE APPLICATION

BACKGROUND

Apparatuses that blend, mix, cut, chop, etc., various ingredients include, for example, blenders, mixers, food processors, spice grinders, coffee grinders, etc. When such apparatuses are being utilized to blend and/or mix ingredients, recipes for the blending and/or mixing of the ingredients are generally measured by volume. However, measuring a cup of fresh spinach or a cup of ice cubes and obtaining a consistent result after blending may be difficult. This may be due to, for example, measuring odd sized ingredients by volume. More particularly, recipes may call for a whole banana, a half of an avocado, etc. However, produce generally varies by size, shape and weight. Thus, in order to achieve consistency for recipes, measuring ingredients by weight may allow one to accurately measure ingredients for consistency in utilizing the recipe and in tracking nutritional information.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
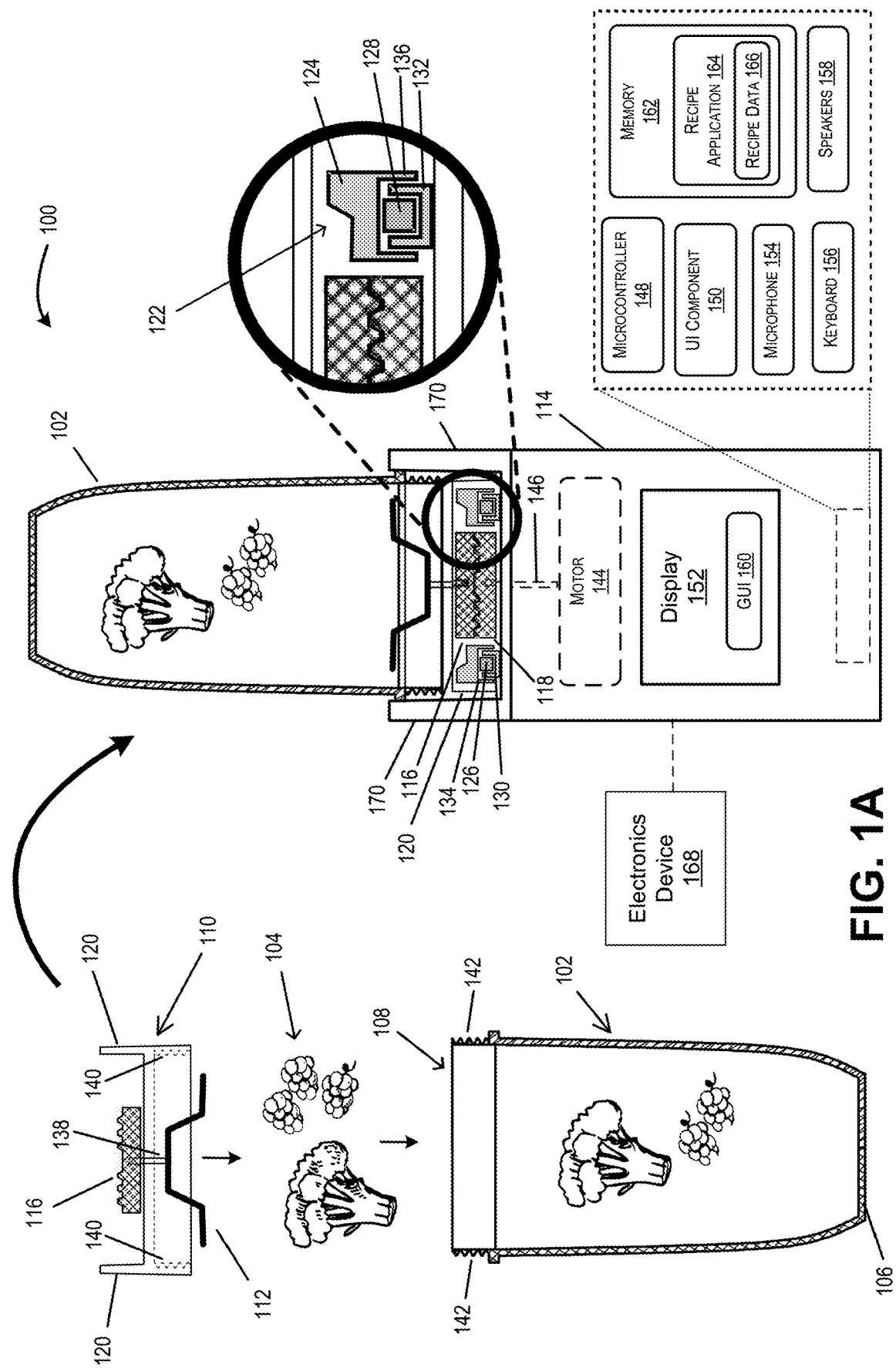
FIGS. 1A and 1B schematically illustrate an example of a mixing apparatus that includes an integrated scale, in accordance with various configurations.

Described herein is a mixing apparatus, e.g., a blender, that includes an integrated smart scale that includes a recipe application and a user interface for interacting with the recipe application and the mixing apparatus. The mixing apparatus uses the recipe application and verification information to create a foodstuff based upon a selected recipe. The integrated smart scale is configured such that a plate of the integrated smart scale is mounted atop the mixing apparatus to allow for a vessel that receives ingredients to sit apart from a motor clutch mechanism of the mixing apparatus and to engage the plate when measuring ingredients. The integrated smart scale is also configured and mounted to allow the vessel to operatively engage with the motor of the mixing apparatus when blending and/or mixing ingredients, while not engaging the plate of the integrated smart scale. While the present disclosure describes aspects herein with respect to a mixing apparatus such as, for example, a blender, it is to be noted that similar appliances that utilize a container sitting on top of a base that includes a motor may also benefit from the concepts disclosed herein to implement an integrated scale. Examples include, but are not limited to, mixers, food processors, spice grinders, coffee grinders, etc.

More particularly, the integrated smart scale can provide, for a user, an indication of the weights of ingredients as the individual ingredients are added to a container in which they can be combined, as well as a target weight for individual ingredients with an indication when the weight of the ingredient is achieved. Furthermore, the integrated smart scale can also provide a target weight for individual ingredients alerting the user when a certain predetermined amount of ingredient has been added.

Still further, the integrated smart scale can support adjustments to the serving size of recipes. When a recipe is scaled, such as, for example, from 1 serving to 3 servings or from 1 serving to ½ serving, the weight of the ingredients also can be adjusted to change the target weight and presented to the user, as well as similarly an indication when the target adjusted serving size is achieved. In this way, the integrated smart scale can support precision weight measurement of ingredients based on predetermined recipe proportions, as well as serving size changes to all ingredients at the same time. In some examples, the recipe serving size change can occur based on a change to the weight of an individual ingredient, such as for example, based on an error of adding too much of an ingredient by accident. In this case, the integrated smart scale can apply the change to the individual ingredient to the recipe as a whole by changing the overall serving size for the recipe and for every ingredient of the recipe.

Combining the smart scale with an apparatus that blends, mixes, cuts, chops, etc., can allow for users of such apparatuses to more accurately follow and/or adjust recipes. Such a combination needs an application to provide the recipes and accompanying instructions to the users. Furthermore, a user interface (UI) that allows users to interact with the application and/or the apparatus may also be beneficial to allow users to select recipes, alter recipes, add recipes and/or delete recipes.

In accordance with configurations, the integrated smart scale includes a load cell assembly that includes the plate and that is mounted on top of a motor enclosure (base) of an apparatus such as, for example, a blender, food processor or similar appliance. The load cell assembly generally surrounds a spinning motor connection, which is often referred to as a clutch, through which the agitator, e.g., mixing blade, operatively engages with the motor.

In accordance with configurations, the vessel does not engage with the motor clutch while the vessel is sitting on the load cell assembly. The shape of the integrated scale surface is generally designed in concert with the vessel shape to allow the vessel to sit on the load cell assembly of the integrated smart scale in one orientation and then to engage the motor clutch while in a different orientation, e.g., by moving or rotating the vessel vertically (i.e. flipping) and/or horizontally with respect to the base.

When the vessel is mounted atop the mixing apparatus and in contact with the integrated smart scale, the contents provided in the vessel may be weighed. In one scenario, a user may add ingredients while the vessel sits on the mixing apparatus and the integrated smart scale measures the weight as the ingredients are added.

In another example, the user may add ingredients to a vessel that is open at the top and then place the vessel on the mixing apparatus such that the vessel is in contact with the integrated smart scale. If a recipe the user is following requires multiple ingredients, the user may add all ingredients to the vessel at once and then place the vessel on the integrated smart scale, or may remove the vessel from the mixing apparatus to add subsequent ingredients and then replace the vessel on the mixing apparatus such that the vessel is in contact with the integrated smart scale. A recipe being followed by the user may be altered by the mixing apparatus each time the vessel is replaced on the mixing apparatus and the integrated smart scale to maintain the proportions among the ingredients of the recipe. Once all ingredients have been added, a lid may be placed over the open end to close the vessel.

In configurations, the ingredients and weights for ingredients may be provided in feedback to the user via a user interface (UI) of the integrated smart scale that may utilize audio/visual (A/V) techniques via one or more of a display, a microphone, speakers, keyboard, etc. on the apparatus. The feedback/UI can further be implemented as a graphic user interface (GUI) on a display that may be integrated into the base. In configurations, the integrated smart scale may be implemented via memory and processors in the mixing apparatus that enable the mixing apparatus to present a GUI in the form of a graphical recipe interface on the display.

In configurations, the recipe application may provide recipes that include a set of instructions for preparing a particular food or drink item. An ingredient may include any component of a recipe, including raw ingredients (e.g., eggs, butter, oats, carrots, chicken breast, etc.), and prepared ingredients (e.g., ice cream, butter, pasta sauce, etc.).

In some configurations, the functionalities associated with the recipe application may include the graphical recipe interface, a series of visual and/or audio signals for guiding an individual through a recipe, or a combination thereof. For example, the recipe application may present a graphical recipe interface that includes a recipe step that a certain amount of an ingredient is to be added to the vessel while on the integrated smart scale of the mixing apparatus. The recipe application may also cause one or more lighting elements on the mixing apparatus to be activated so as to draw the attention of the individual to the vessel on the integrated smart scale of the mixing apparatus.

More particularly, the recipe application may direct an individual to place a vessel on the integrated smart scale of the mixing apparatus, and to add a first ingredient to the vessel. The smart scale may then detect that the vessel has been placed onto the smart scale and then detect a change in the mass of the vessel as the first ingredient is added to the vessel, which is referred to herein as a "pour event," e.g., pouring of an ingredient into the vessel.

The recipe application may receive information data associated with the addition of the first ingredient to the vessel and then verify that the ingredient was indeed added to the vessel. For example, the recipe application may determine that the change in mass matches an expected change in mass for the first ingredient presented by the recipe application. Once the addition of the first ingredient has been verified, the recipe application may generate and store consumption data for the ingredient. The consumption data may identify the first ingredient, an amount added, one or more times related to the pour event (e.g., time the pour started, time the pour finished, duration of the pour event, etc.), nutritional information for the poured first ingredient, a brand or other identifier associated with the first ingredient, a user identifier associated with the individual preparing the recipe, an indication that the first ingredient was verified by information from the mixing apparatus, etc.

Once the recipe application verifies that the first ingredient has been added, the recipe application may cause another ingredient for addition to the vessel according to the recipe to be presented via the graphical recipe interface. The user may then begin to add the second ingredient to the vessel and the process previously described may be repeated. This may continue until all ingredients have been added according to the recipe and then the vessel may disengage the smart scale and engage the motor clutch to allow for mixing of the ingredients.

Figure 1B:
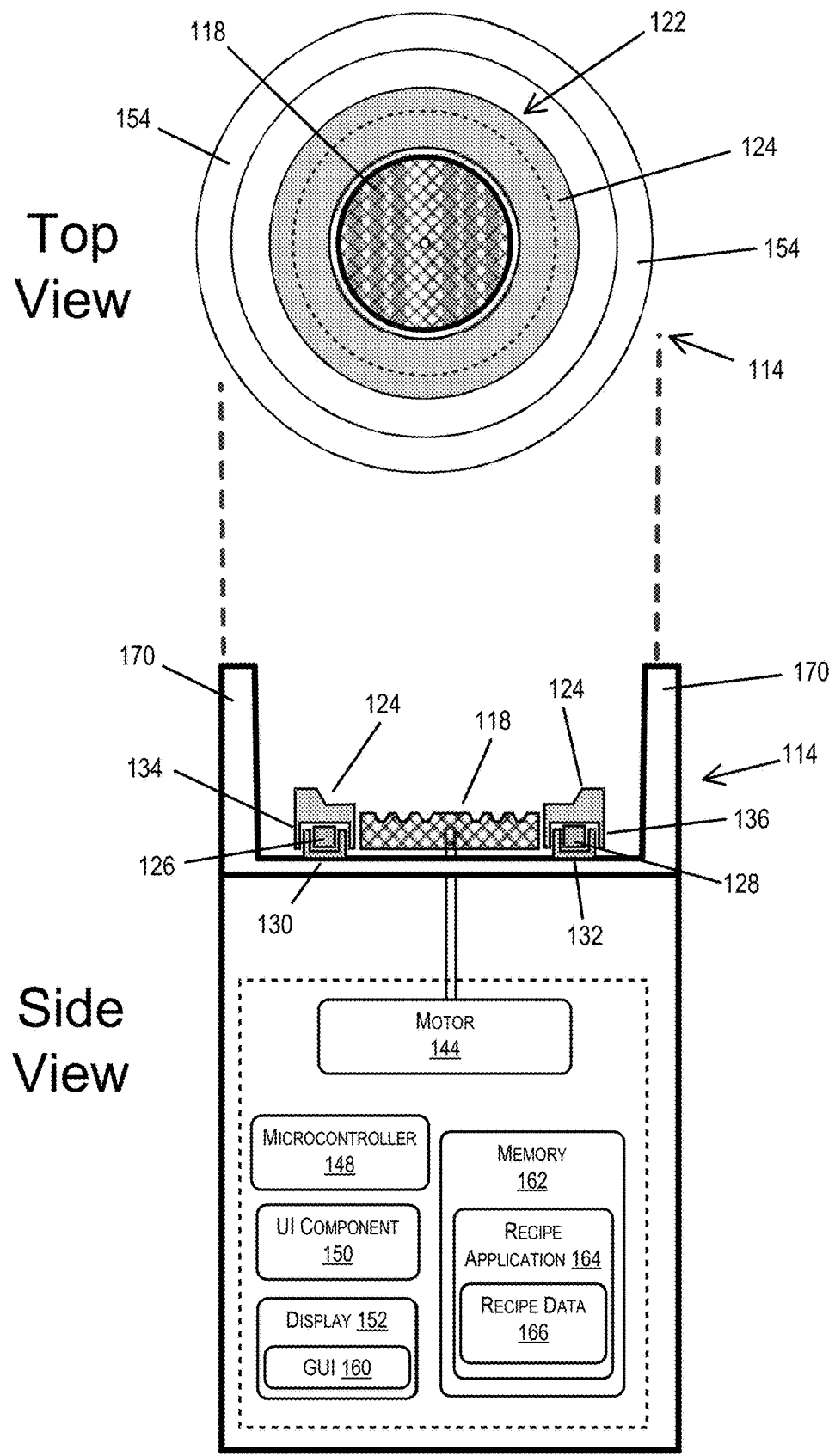

FIGS. 1A and 1B schematically illustrate an example of a mixing apparatus 100 in the form of a blender that includes a vessel 102 for receiving ingredients 104. The illustrated example blender is generally a type referred to as a personal blender. Personal blenders generally use a vessel 102 in the form of a blender cup with one enclosed end 106 and one opposing open end 108 to form a structure like a cup or bowl. Thus, the vessel 102 may be referred to as a blender cup 102 herein with reference to the example arrangements of FIGS. 1-3. In configurations, the mixing apparatus 100 may include multiple, interchangeable blender cups 102. The multiple, interchangeable blender cups 102 may generally be of differing sizes and/or shapes.

As can be seen in FIG. 1A, ingredients 104 are added through the open end 108. A separate coupling unit 110 that includes an agitator 112, which may be in the form of a blender blade or mixing blade, is then attached to the blender cup 102 at the open end 108. In this manner, the coupling unit 110 effectively functions as a lid for the blender cup 102, enclosing the ingredients within the vessel. The entire blender cup 102 and the attached coupling unit 110 is moved horizontally relative to a base 114 or inverted and placed on the base 114. The coupling unit 110 includes a coupling clutch plate 116 that engages with a motor clutch plate 118 of the base 114. The coupling between coupling clutch plate 116 and motor clutch plate 118 may be mechanical, frictional, electrical, magnetic, electromagnetic, or by other means known in the art.

In accordance with configurations, an integrated smart scale 122 is included on the base 114 around the motor clutch plate 118. The integrated smart scale 122 includes a plate 124 and two load cells 126, 128 that are located on opposite sides of the base 114. The load cells 126, 128, as may be seen in FIGS. 1A and 1B, are held in place on the base 114 in brackets 130, 132. At least a portion of the plate 124 includes extensions 134, 136 that extend on and over sides of the brackets 130, 132 to help protect the load cells 126, 128. In configurations, four load cells may be included if desired, where the four load cells are arranged around the integrated smart scale 122 such that the first two load cells 126, 128 are located opposite to one another and the other two load cells are located opposite to one another and offset by 90 degrees with respect to the load cells 126, 128. In configurations, there may be more or fewer load cells, e.g., three load cells, five load cells, etc. Additionally, in configurations, the load cells may be arranged and offset from each other by different angles than 90 degrees. Also, in configurations, the load cells may be arranged and offset from each other by varying amounts, e.g., not a constant 90 degrees.

As can be seen in FIG. 1A, the agitator 112 is coupled to an axis 138 that is coupled to the coupling clutch plate 116. The coupling unit 110 further includes threads 140 defined within an inner portion of the coupling unit 110 that cooperate with threads 142 of the blender cup 102 to couple the blender cup 102 to the coupling unit 110. The coupling unit 110 and the blender cup 102 may be coupled together by "screwing" the cooperating threads 140, 142 together. This may be achieved by rotating one or both of the blender cup 102 and/or the coupling unit 110 relative to one another. Isolation walls 120 are also included on the coupling unit 110 that isolate the coupling clutch plate 116, as will be further described herein.

The base 114 includes a motor 144 that is operatively coupled to an axis 146. The axis 146 is coupled to the motor clutch plate 118. Thus, during operation of the mixing apparatus 100, the motor 144 rotates the axis 146, which rotates the motor clutch plate 118. Since the motor clutch plate 118 is engaged with the coupling clutch plate 116, the coupling clutch plate 116 also rotates, which rotates the axis 138 to thereby rotate the agitator 112 and mix and/or blend the ingredients 104 in the blender cup 102.

In configurations, the base 114 also includes a microcontroller 148 and a user interface (UI) component 150 that implement functionality of the smart scale 122. The UI component 150 provides feedback or instructions to the user as the user fills the vessel with ingredients and the scale outputs measurements, as will be discussed further herein. The UI component 150 may alternatively or additionally provide directions associated with how to operate the device. The UI component 150 may be implemented utilizing audio/visual (A/V) techniques and components via one or more of a display 152, a microphone 154, keyboard 156, speakers 158, etc. to provide audio and/or visual feedback.

In configurations, the base 118 is further equipped with the display 152 and depending upon implementation, may also be equipped with a graphic user interface (GUI) 160 depicted or presented on the display 152, as will be discussed further herein. The GUI 160 may be part of the display 152 in configurations, as illustrated.

In configurations, the UI component 150 and the GUI 160 may be a single component depending upon the implementation of the UI component 150 and the GUI 160. Thus, the UI component 150 may comprise the display 152 and the GUI 160 and provide further functionality to the integrated smart scale 122. In configurations, one or more manual or physical controls (not illustrated) may also be included on the base 114, if desired.

In a configuration, memory 162 is also included. A recipe application 164 may be stored in the memory 162 or included in memory of the microcontroller 148 to implement further functionality of the integrated smart scale 122, as will be discussed further herein. The recipe application 164 may include recipe data 166, e.g., recipes, that includes data related to one or more recipes that may be followed by a user of the mixing apparatus 100 to create a drink or food item using the mixing apparatus, as will be discussed further herein.

In configurations, the microcontroller 148 may communicate with a computing device, e.g., an electronics device 168, either mobile or stationary, that includes the recipe data 166 to be executed by the recipe application 164. In configurations, the communication may be achieved via the recipe application 164. Such communication may be either wired or wirelessly and may be achieved with the separate electronics device 168 that is communicatively coupled to the mixing apparatus 100 via, for instance, short range communication protocols such as Bluetooth®. Examples of such an electronics device 168 include, but are not limited to, mobile telephones, cellular telephones, mobile computers, Personal Digital Assistants (PDAs), radio frequency devices, handheld computers, laptop computers, tablet computers, palmtops, as well as desktop computers, devices configured as Internet of Things (IoT) devices, integrated devices combining one or more of the preceding devices, and/or the like.

Additionally, the microcontroller 148 may communicate with a network site over a network, e.g., a website over the Internet, to access and/or acquire recipe data 166. In configurations, the communication may be achieved via the recipe application 164. Such communication may be either wired or wirelessly.

FIG. 1B schematically illustrates a side view and a top view of the base 114 of the mixing apparatus 100. Isolation walls 170 of the base 114 extend around an outer periphery of the base 114. As can be seen, the base 114 generally has a circular cross-sectional shape, although in other configurations, the base 114 may have a different cross-sectional shape. As can also be seen in FIG. 1B, the plate 124 of the integrated scale 122 has a ring shape or circular shape and generally surrounds the motor clutch plate 118, although other shapes may be utilized if desired. In accordance with configurations, the blender cup 102 is also generally round or circular in cross-sectional shape like the plate 124 of the integrated scale 122. However, other shapes may be utilized if desired.

Figure 2:
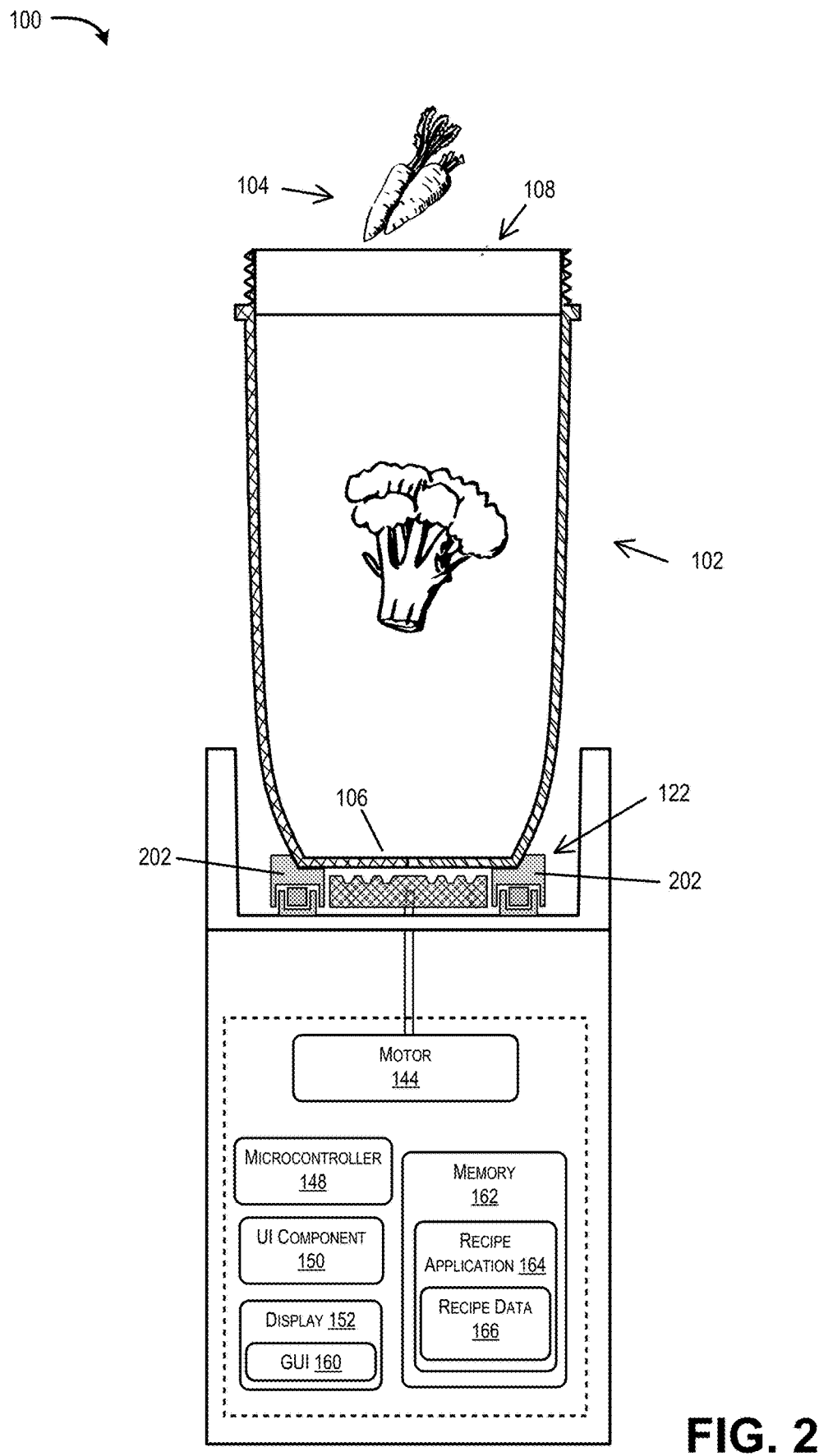
FIG. 2 schematically illustrates a vessel arranged on the integrated scale, in accordance with various configurations.

FIG. 2 schematically illustrates the blender cup 102 resting on the integrated scale 122 by placing the closed end 106 of the blender cup 102 on the plate 124 of the integrated smart scale 122. As may be seen in FIG. 2, the plate 124 may include a raised edge 202 to help register/center the blender cup 102 on the plate 124. The raised edge 202 may also help keep the blender cup 102 stable as ingredients 104 are added to the blender cup 102.

As may be seen in FIG. 2, while the blender cup 102 is resting on the plate 124, the blender cup 102 is not engaged with the motor clutch plate 118 and is sitting above the motor clutch plate 118.

A user may use the mixing apparatus 100 to create a food or drink item using the recipe application 164. The microcontroller 148 may execute the recipe application 164 and can present a list of possible recipes to the user for selection of a recipe by the user. The user may select a desired recipe using the UI component 150 or the GUI 160. In configurations, the user may enter the name of a desired recipe via the UI component 150 or the GUI 160. For example, the user may say the name of the desired recipe or may type the name of the desired recipe depending upon the implementation of the UI component 150 and/or the GUI 160.

As ingredients 104 are added to the blender cup 102, the weight of the ingredients 104 added to the blender cup 102 may be ascertained by the integrated smart scale 122. The information regarding the weight of the ingredients 104 added to the blender cup 102 may be provided to the microcontroller 148 and can be displayed on the display 152 and/or may be audibly provided by the UI component 150 so that a user may see and/or hear the weight of ingredients 104 as they are added. The weight displayed on the display may be per ingredient or may be an accumulated total weight. More particularly, analog voltage values from the load cells 126, 128 of the integrated scale 122 may be provided to an analog-to-digital converter (ADC) that may be included in the microcontroller 148. In configurations, the ADC is separate from the microcontroller 148. The ADC converts the analog voltage values to digital values. The digital voltage values are converted to weights by the microcontroller 148 using stored calibration data.

In configurations, when the weight displayed is per ingredient, the user may indicate, either through the UI component 150, the GUI 160 or physical controls (not illustrated), that a new ingredient is now being added. Alternatively, if the recipe application 164 is being executed by the microcontroller 148 (and thus the user is following a recipe), then as ingredients are added and the appropriate amount of ingredient based upon weight has been reached, the microcontroller 148 may inform the user, via the UI component 150 and/or the GUI 160, to begin adding a subsequent ingredient. Such indication by the microcontroller 148 may be provided on the display 152 and/or audibly by speakers 158.

The recipes generally include needed weights for various ingredients 104. As previously noted, the mixing apparatus 100 may include memory 162 to store the recipe application 164 and/or recipes for execution by the microcontroller 148. In configurations, the microcontroller 148 may include memory to store the recipe application 164 and/or the recipes. The recipes may be provided to the microcontroller 148 from an external electronic device, e.g., electronic device 168, when desired. Nutritional information may also be included within the recipes and displayed via the display 152 to the user of the mixing assembly 100. In configurations, the recipes may be based upon nutritional values. For example, a first ingredient may include an average nutritional value per unit of weight and a second ingredient may include another average nutritional value per unit of weight. The recipe may be written to provide a certain amount of nutritional value per serving and thus, the recipe may provide weights based upon a number of servings desired, a total amount of nutritional value desired, etc.

Figure 3:
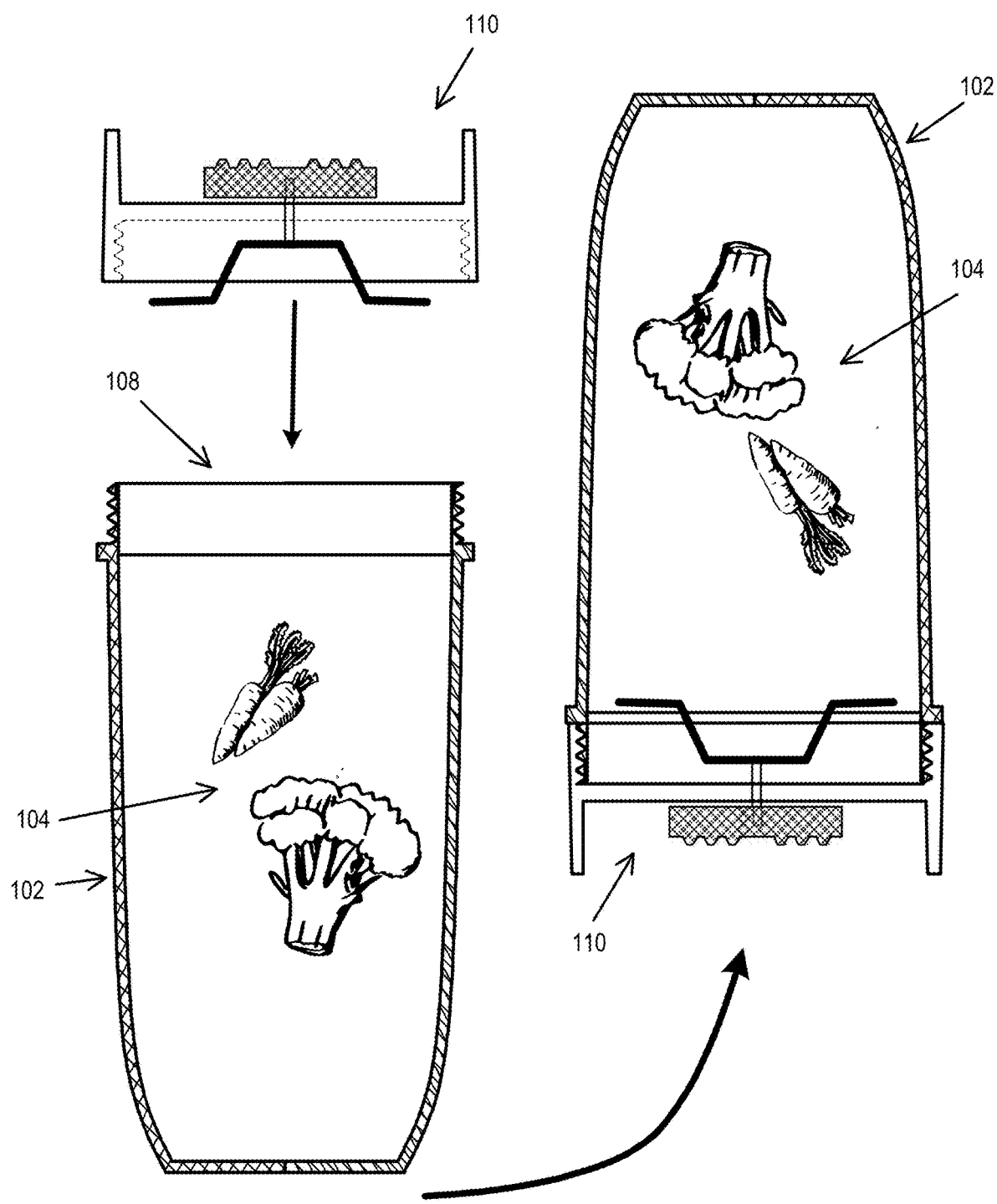
FIG. 3 schematically illustrates coupling a coupling unit to the vessel, in accordance with various configurations.

Referring to FIG. 3, once the ingredients 104 have been added to the blender cup 102, then the coupling unit 110 may be attached or coupled to the blender cup 102. As previously noted, in configurations, the coupling unit 110 may be coupled to the blender cup 102 by screwing the coupling unit 110 and the blender cup 102 relative to one another to thereby couple the coupling unit 110 to the blender cup 102 via the cooperating threads 140, 142. In other configurations, a snapping configuration may be provided wherein the coupling unit 110 is snapped to the blender cup 102. Additionally, the snapping configuration may be a type where the coupling unit 110 is placed on the blender cup 102 and then slightly twisted to lock the coupling unit 110 in place on the blender cup 102.

Once the coupling unit 110 is coupled to the blender cup 102, then the blender cup 102 and coupling unit 110 are moved vertically relative to the base 114 or inverted (as illustrated in FIG. 3) and placed on the base 114 of the mixing apparatus 100 as illustrated in FIG. 1A. The motor 144 may then be activated, either automatically or manually. As may be seen, the isolation walls 120 of the coupling unit 110 are adjacent to and may engage the isolation walls 170 of the base 114. This helps hold the blender cup 102 and coupling unit 110 in place during operation of the mixing apparatus 114.

As previously noted, the coupling clutch plate 116 engages the motor clutch plate 118 thereby operatively coupling the agitator 112 to the motor 144. Thus, when the motor 144 operates and rotates the axis 146, the motor clutch plate 118 rotates thereby rotating the coupling clutch plate 116. The rotation of the coupling clutch plate 116 rotates the axis 138 coupled to the agitator 112 to thereby rotate the agitator 112. Rotation of the agitator 112 thereby mixes and/or blends the ingredients 104 within the blender cup 102.

FIGS. 4A-4D illustrate a configuration of a mixing apparatus 400 in the form of a blender and thus, for the example configuration of FIGS. 4A-4D, the mixing apparatus will be referred to as blender 400. The blender 400 utilizes a vessel in the form of a blender jar 402a similar to conventional blender jars. The blender jar 402a includes an open end 404 that is configured to receive a lid 406. In configurations, as is known with blender jars, the opposite end 408 of the blender jar 402 includes an agitator 410 coupled to an axis 412 that is coupled to a blender clutch plate 414. In configurations, the agitator 410, axis 412 and blender clutch plate 414 may be removable, as is known with conventional blender jars.

The clutch plate 414 is configured for engagement with a motor clutch plate 416 of a base 418 of the blender 400. The motor clutch plate 416 is coupled to an axis 419 that is coupled to a motor 420 to rotate the motor clutch plate 416, which in turn rotates the blender clutch plate 414 and thereby the agitator 410, e.g., a blending blade or mixing blade. The coupling between blender clutch plate 414 and motor clutch plate 416 may be mechanical, frictional, electrical, magnetic, electromagnetic, or by other means known in the art. The base 418 is similar to the base 114 as previously described with respect to the example configurations of FIGS. 1-3 and thus, may also include one or more of a microcontroller 148, UI component 150, display 152, microphone 154, keyboard 156, speakers 158, and/or GUI 160. The base 418 may also include one or more physical or manual controls (not illustrated). Additionally, an electronics device, e.g., the electronics device 168, may interact with the mixing apparatus 400 as previously described herein.

As previously described with respect to FIGS. 1-3, in configurations, memory 162 is also included. The recipe application 164 may be stored in the memory 162 or included in the microcontroller 148 to implement further functionality of an integrated smart scale 436. The recipe application 164 may include recipe data 166, e.g., recipes, that includes data related to one or more recipes that may be followed by a user of the mixing apparatus 100 to create a drink or food item using the mixing apparatus, as previously described with respect to the mixing apparatus 100.

As previously described, in configurations, the microcontroller 148 may communicate with a computing device, e.g., an electronics device 168, either mobile or stationary, that includes the recipe data 166 to be executed by the recipe application 164. In configurations, the communication may be achieved via the recipe application 164. Such communication may be either wired or wirelessly and may be achieved with the separate electronics device 168 that is communicatively coupled to the mixing apparatus 100 via, for instance, short range communication protocols such as Bluetooth®.

Additionally, as previously described, the microcontroller 148 may communicate with a network site over a network, e.g., a website over the Internet, to access and/or acquire recipe data 166. In configurations, the communication may be achieved via the recipe application 164. Such communication may be either wired or wirelessly.

Figure 4A:
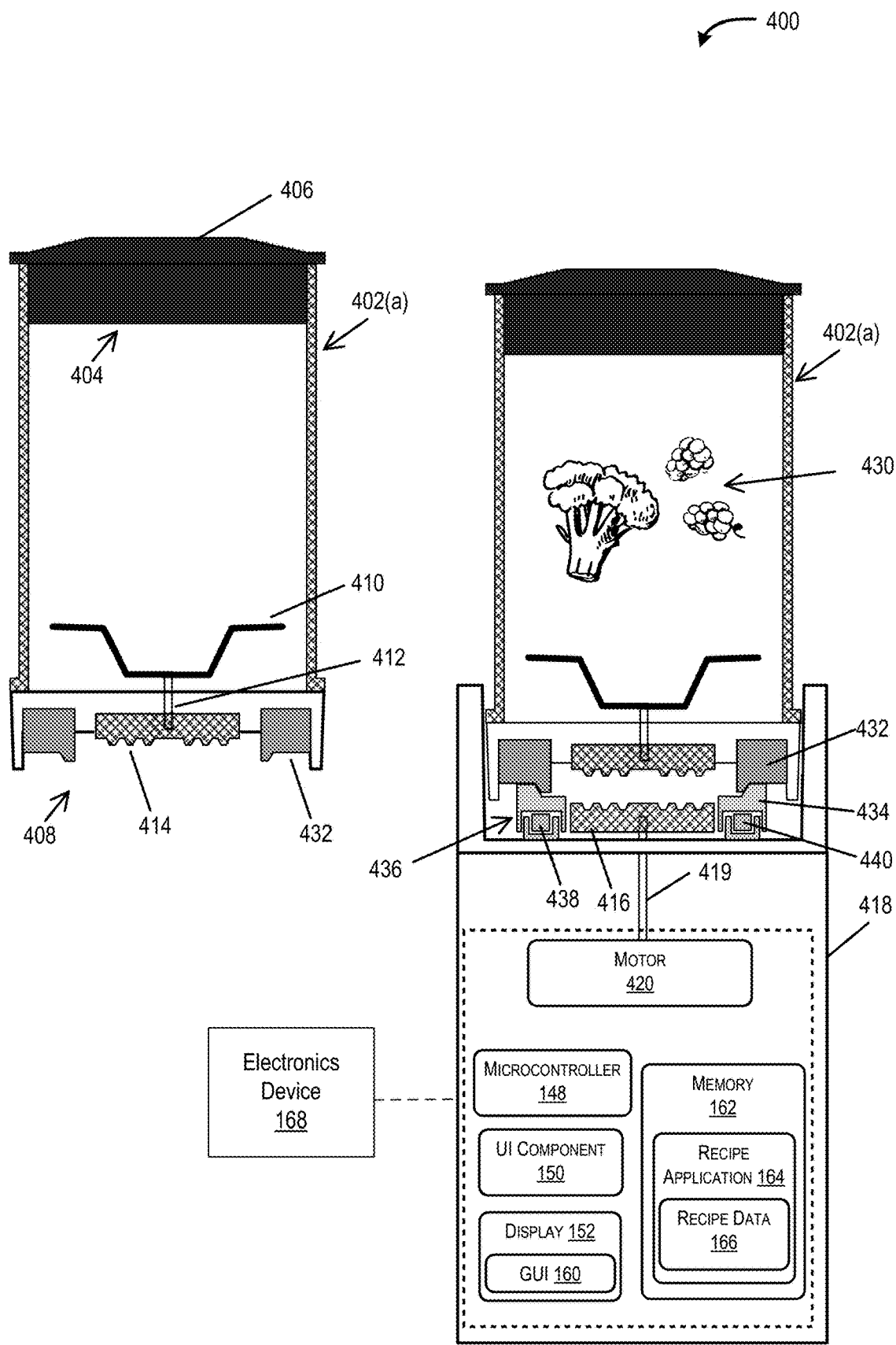
FIGS. 4A-4D schematically illustrate another example of a mixing apparatus that includes an integrated scale, in accordance with various configurations.
Figure 4B:
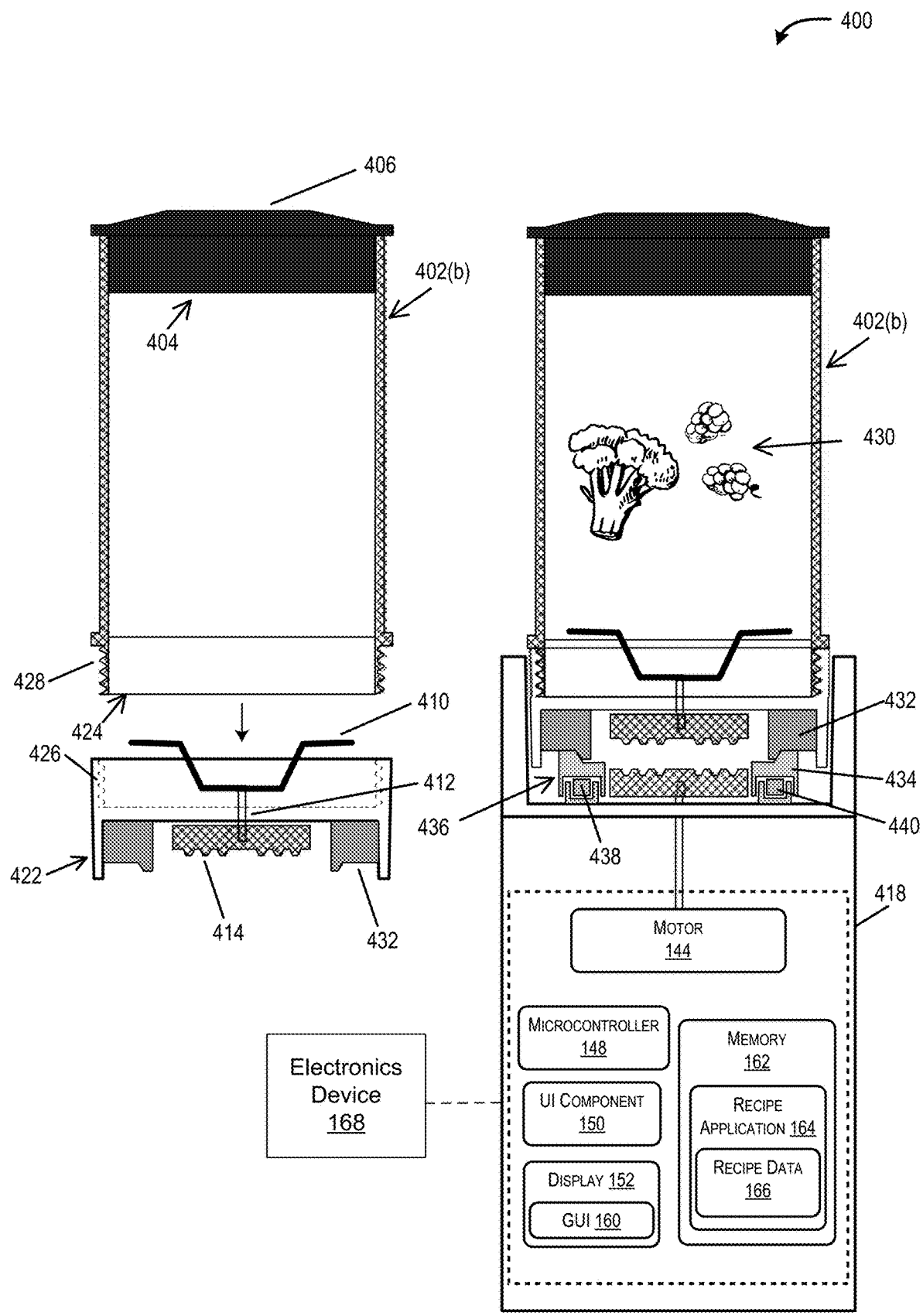

Referring to FIG. 4B, in configurations, the agitator 410, axis 412 and blender clutch plate 414 may be included within a coupling unit 422 similar to coupling unit 110. In such a configuration, the blender jar 402b is open at end 424. The coupling unit 422 may be secured to the blender jar 402b at the end 424 via cooperating threads 426, 428 on the blender jar 402b and the coupling unit 422, respectively. Alternatively, as previously described with reference to the example configurations of FIGS. 1-3, a snapping arrangement or a twist and lock arrangement may be utilized to couple the blender jar 402b and the coupling unit 422. Since the end 404 is open, the coupling unit 422 is coupled to the end 424 prior to adding any ingredients 430.

The blender jar 402a and the coupling unit 422 each further include a key 432 that may be utilized to engage a plate 434 of the integrated scale 436 so that ingredients 430 may be added to the blender jar 402a, 402b and weighed, as previously described with respect to FIGS. 1-3. The integrated scale 436 is similar to the integrated scale 122 described with respect to the example configurations of FIGS. 1-3. The integrated scale 436 includes a plate 434 and two load cells 438, 440 that are locate on opposite sides of the base 418.

Once the ingredients 430 have been added to the blender jar 402a, 402b, via the open end 404, the lid 406 may be placed over the blender jar 402a, 402b and the blender jar 402a, 402b may be moved horizontally relative to the base 418 or rotated, e.g., 45 to 90 degrees, such that the key 432 no longer engages the plate 434, as will be described with respect to FIGS. 4C and 4D. The blender jar 402a, 402b may then lower down onto the base 418 such that the blender clutch plate 414 engages the motor clutch plate 416.

Figure 4C:
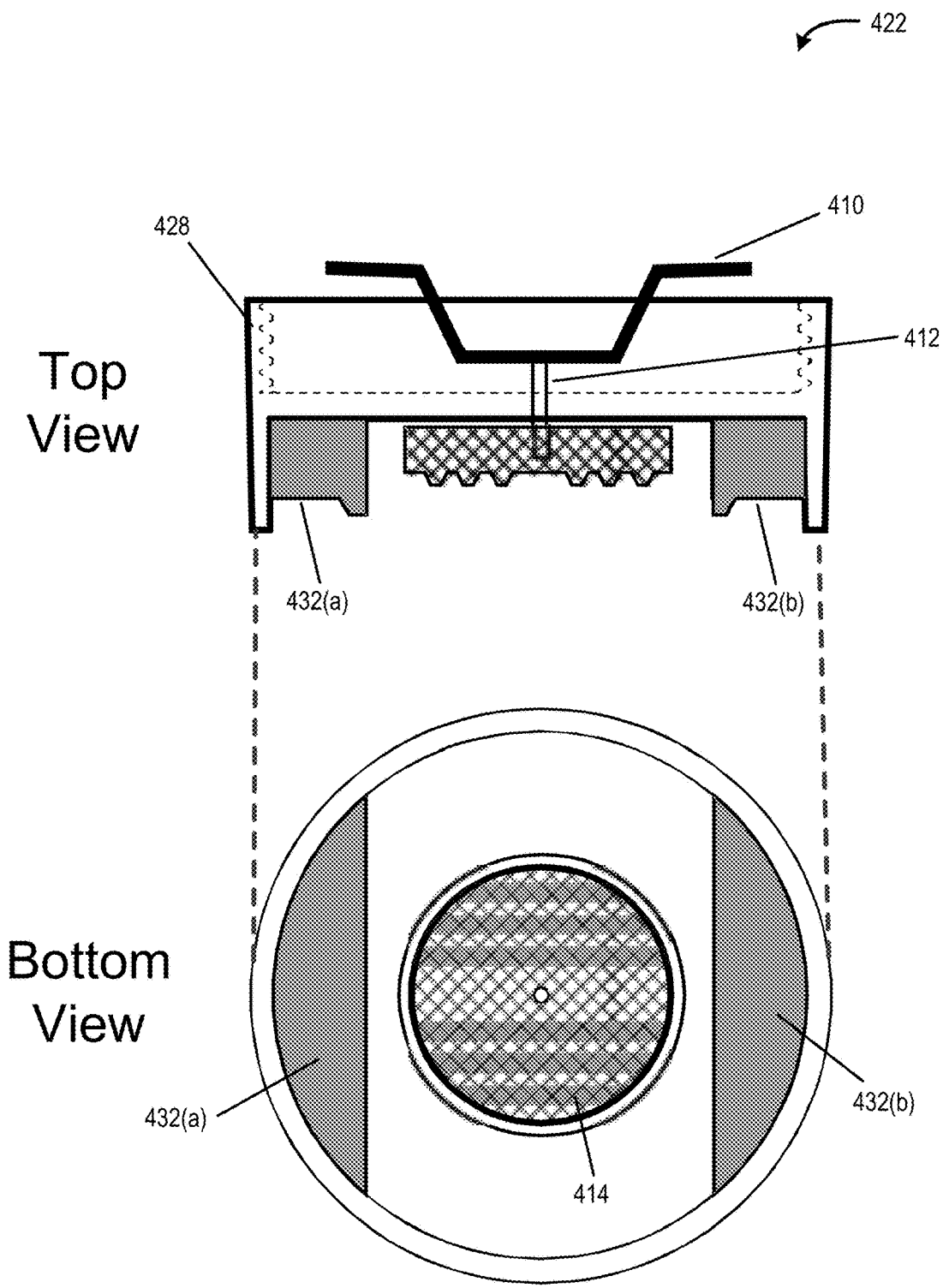

FIG. 4C is a top and side view of the coupling unit 422 and illustrate an example of the arrangement of the key 432 on the coupling unit 422. Such an arrangement also corresponds to the bottom of the blender jar 402a. As can be seen, the key 432 includes two portions 432a, 432b that are located on two opposing sides of the bottom of the coupling unit 422. Likewise, the bottom of the blender jar 402a includes such a key 432 arranged in a similar fashion.

Figure 4D:
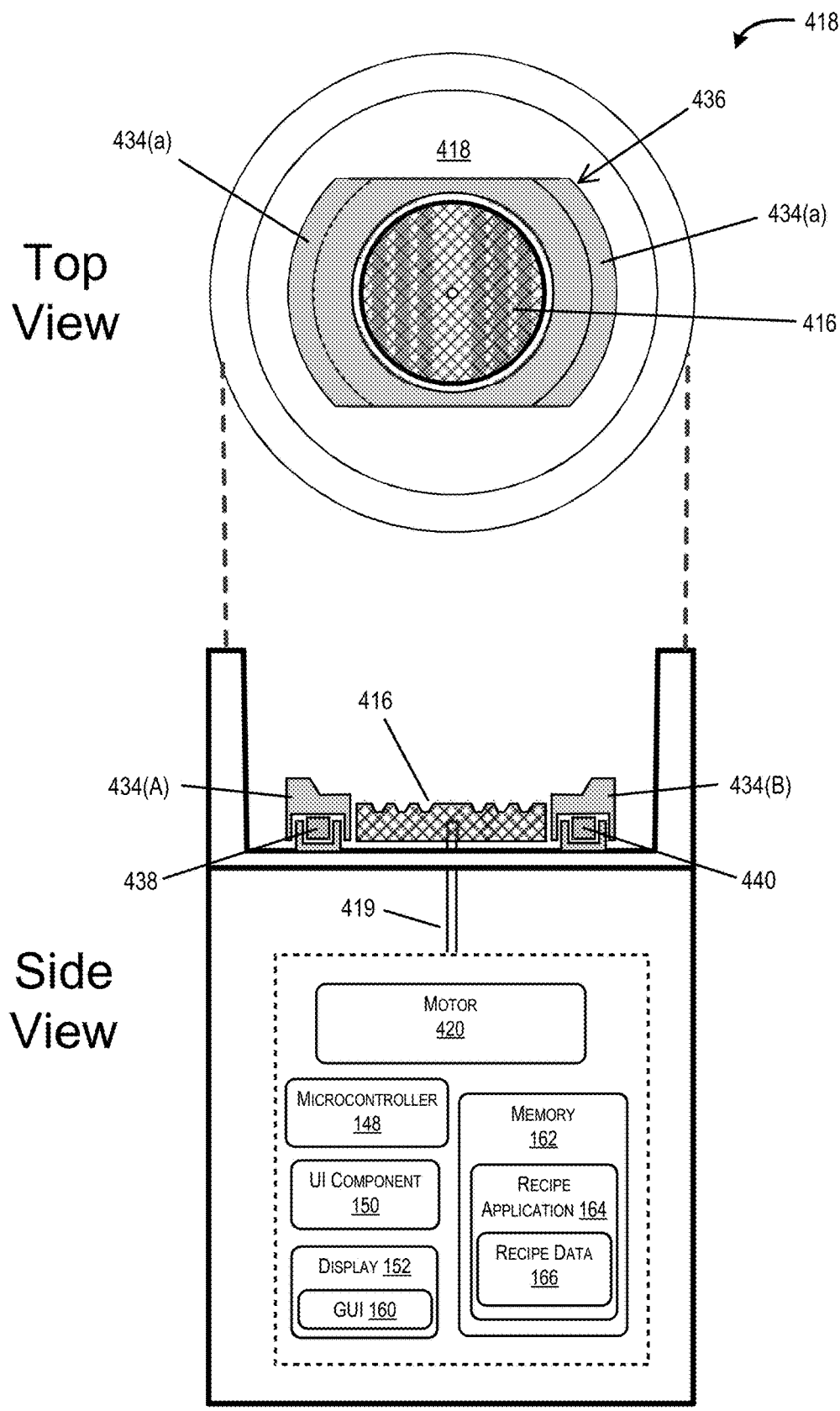

FIG. 4D is a top and side view of the base 418 and shows the arrangement of the plate 434, wherein the plate 434 includes two opposing portions 434a, 434b. The load cells 438 and 440 may be located, as can be seen in FIG. 4D, under respective plate portions 434a, 434b.

Thus, when the blender jar 402a and the blender jar 402b with the coupling unit 422 is placed on the plate portions 434a, 434b such that the key 432 engages the plate portions 434a, 434b, the plate portions 434a, 434b may be utilized to measure weights of ingredients 430 added to the blender jar 402a, 402b, as previously described with respect to the example configurations of FIGS. 1-3. When the blender jar 402a, 402b is moved horizontally relative to the base 418 or rotated, the key 432 will no longer engage the scale ring plate and will thus engage the base 418 of the mixing assembly 400. This lowers the blender jar 402a, 402b, thereby engaging the clutch plate 416 and 418 to allow for rotation of the agitator 410 via the motor 420.

FIGS. 4C and 4D illustrate a key and plate mechanism with two symmetric segments. Additionally, in configurations, the key and plate mechanism may comprise three, four, or more segments. The segments may be of equal or unequal sizes, and the segments may be disposed symmetrically or asymmetrically, provided that the key and plate segments can be opposed in at least two configurations, at least one of which allows the container 402a, 402b to engage the integrated scale 436 without engaging the clutch plates 414, 416, and at least one of which allows the containers 402a, 402b to engage the clutch plates 414, 416 without the container 402a, 402b engaging the integrated scale 436.

In configurations, the blender cups 102 and blender jars 402 and/or coupling units 110, 422 may be configured such that the blender cups 102 and blender jars 402 can be moved in multiple directions, e.g., vertically, rotationally, and/or horizontally, with respect to the base 114, 418. Thus, the blender cups 102 and blender jars 402 may engage and disengage the integrated scale 122, 436, as well as engage and disengage the motor clutch plate 118, 416, by either moving vertically, rotationally, horizontally, or a combination of these directions.

Figure 5:
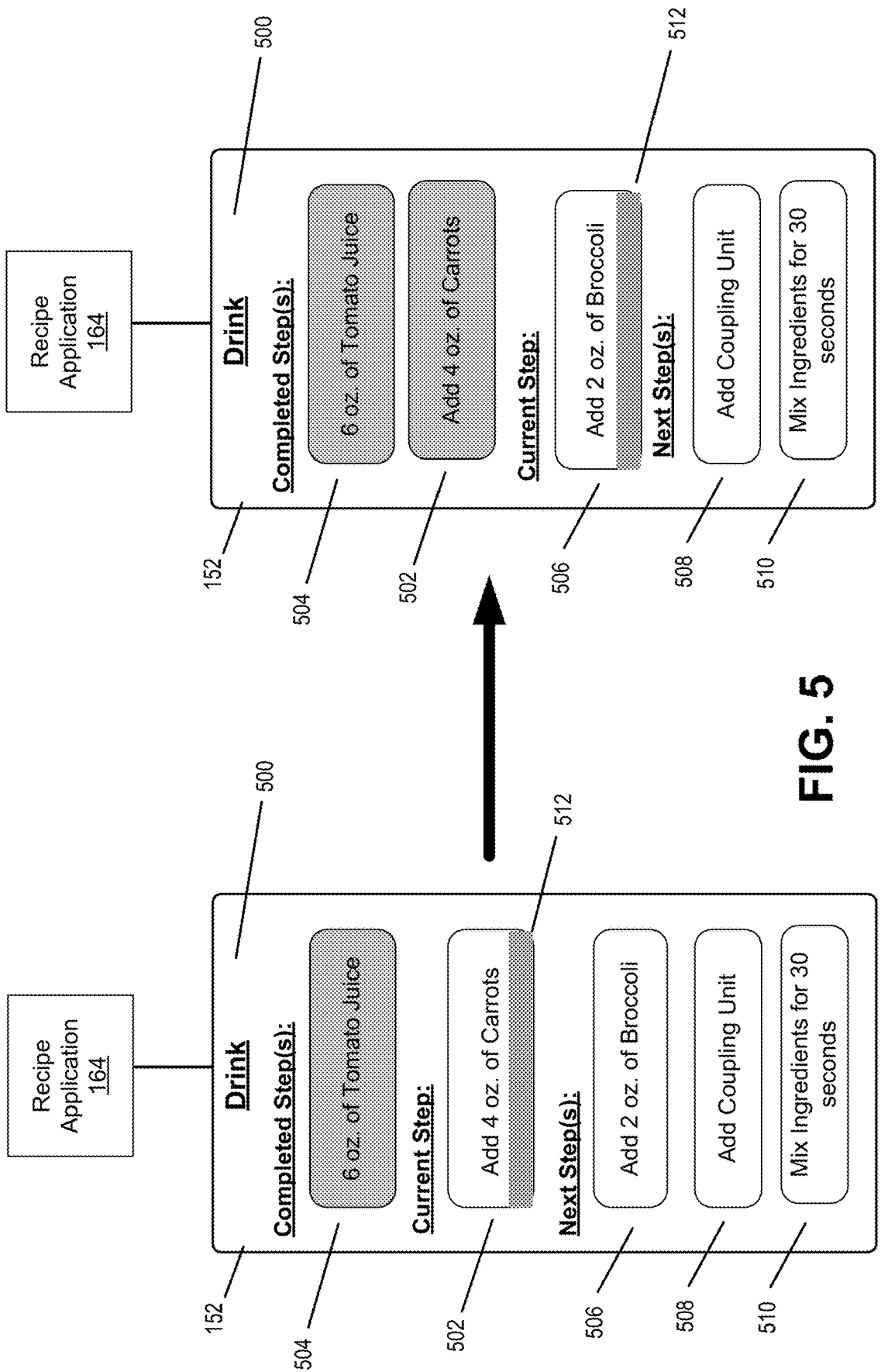
FIG. 5 schematically illustrates an example of a recipe application providing a recipe and information to a user via a UI, in accordance with various configurations.

FIG. 5 illustrates the recipe application 164 of the mixing apparatuses 100 and 400 guiding a user through the completion of a recipe 500 for a drink. FIG. 5 depicts the recipe application 164 presenting the recipe 500 on the display 152 via the UI component 150 and/or the GUI 160. In some configurations, the recipe 500 may present one or more steps 502, 504, 506, 508 and 510. The steps 502, 504, 506, 508 and 510 may correspond to instructions to add ingredients and/or perform actions during the course of making the recipe 500.

The recipe 500 may include a current step 502 that the user is to currently perform or may be currently performing. In some configurations, the microcontroller 148 is configured to receive verification data from the integrated smart scale 122 associated with the current step 502. For example, when the current step 502 corresponds to an ingredient to be added, the microcontroller 148 may receive verification data from the integrated smart scale 122 (or integrated smart scale 436) that indicates a change in the weight or mass of the blender cup 102 (or blender jar 402a or 402b) indicative of an ingredient 104 being added to the blender cup 102.

In some configurations, the current step 502 may be presented as a "clear" block, e.g., the instructions in the current step 502 are visible. As the microcontroller 148 receives verification data indicative of such a change in mass, the microcontroller 148 may present an animation effect 512, where the clear block is filled or "blacked" out (e.g., covering the instructions so that they are clouded, obstructed or totally unreadable) as the ingredient is added to the blender cup 102 (or blender jar 402a or 402b) in accordance with the recipe 500. For example, if the current step 502 calls for the user to add four ounces of carrots, and the verification data indicates a change in mass corresponding to two ounces of carrots being added, then the animation effect 512 may cause the block to be presented as approximately half filled. Thus, the animation effect 512 may move up as the carrots are added to indicate the changing weight or mass of the blender cup 102 (or blender jar 402a or 402b). In configurations, the animation effect 512 may move down, sideways, diagonally, etc., to indicate the changing weight or mass of the blender cup 102 (or blender jar 402 or 402b) as the carrots are added. In configurations, the animation effect 512 may comprise a darkening of the block to indicate the changing weight or mass of the blender cup 102 (or blender jar 402a or 402b) as the carrots are added. Once the full 4 ounces of carrots has been added, the block may be fully filled or darkened and moved to the completed steps. As can be seen, a completed step 504 is already present, where 6 oz. of tomato juice has already been added and the block is already fully filled or darkened and moved to the completed steps.

Once the current step 502 is completed, a next or subsequent step 506 may be to add 2 ounces of broccoli to the blender cup 102 (or blender jar 402a or 402b). Thus, the next step 506 becomes the current step. As the broccoli is added to the blender cup 102 (or blender jar 402a or 402b), the display of the block for step 506 may proceed to be darkened with the animation effect 512 as previously described with respect to step 502 and the adding of the carrots based upon verification data from the integrated smart scale 122 (or integrated smart scale 436).

Once the broccoli has been added, the next step 508 may be to attach the coupling unit 110 (as described with respect to FIG. 3) or attach the lid 406. Thus, the step 508 becomes the current step. For example, once the coupling unit 110 has been coupled to the blender cup 102, the blender cup 102 may be moved vertically, e.g., inverted and placed on the base 114 as illustrated in FIG. 1A. The mixing apparatus 100 may detect that the blender cup 102 has been placed back on the base 114 such that the coupling clutch plate 116 of the coupling unit 110 engages the motor clutch plate 118. If the mixing apparatus 400 is being used, then step 508 may involve moving either the blender jar 402a or 402b such that clutch plate 414 engages the motor clutch plate 416 as previously described. The mixing apparatus 400 may detect that one of the blender jars 402a, 402b has been moved on the base 418 such that the coupling clutch plate 414 engages the motor clutch plate 416. A sensor (not illustrated) may be included on the base 114, 418 to provide the described detection. Once completed, the block for step 508 may be darkened with the animation effect 512 as previously described.

This completes step 508 and thus, step 510 may become the current step. Step 510 may be to mix the ingredients for 30 seconds. The user may then activate the mixing apparatus 100 either via the UI component 150, the GUI 160 or physical components (not illustrated) to activate the motor 144 to activate the agitator 112. In configurations, the microcontroller 148 may automatically activate the motor 144 once the blender cup 102 has been placed back on the base 114. The microcontroller 148 may include a timer that monitors the time of mixing. As the mixing occurs, the display of the block for step 510 may proceed to be darkened with the animation effect 512 as described with respect to step 502 and the adding of the carrots.

Figure 6:
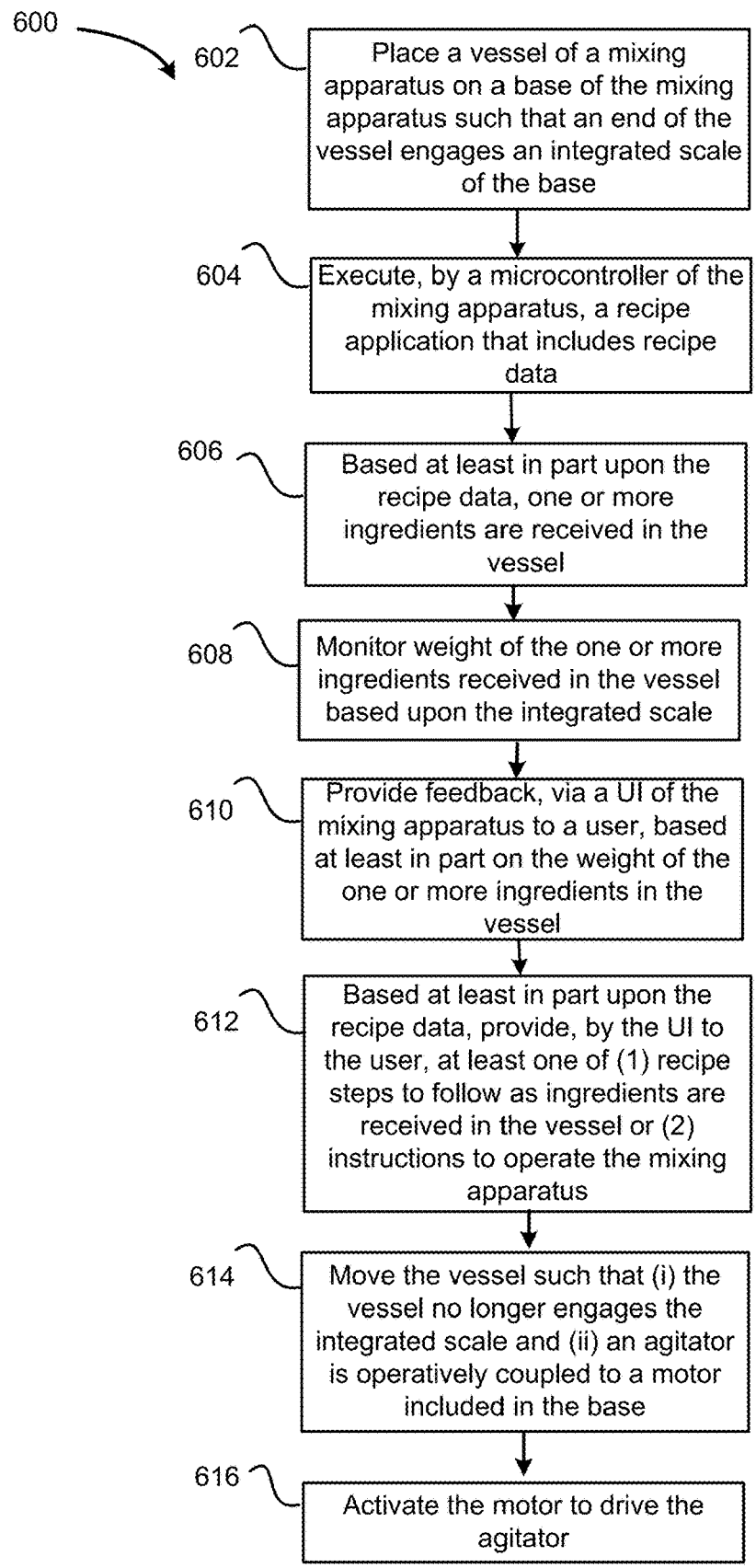
FIG. 6 is a flowchart illustrating an example method of using a mixing apparatus to weigh and mix ingredients.

FIG. 6 is a flowchart illustrating an example method 600 of using a mixing apparatus, e.g., mixing apparatuses 100 and 500, to weigh and mix ingredients. At 602, a vessel, e.g., blender cup 102 or blender jar 402a, 402b, of a mixing apparatus is placed on a base of the mixing apparatus such that an end of the vessel engages an integrated scale of the base. At 604, a recipe application, e.g., recipe application 164, is executed by a microcontroller, e.g., microcontroller 148, of the mixing apparatus. The recipe application includes recipe data, e.g., recipe data 166. The recipe data may provide a recipe that may provide an amount of one or more ingredients and/or an order of the one or more ingredients to be placed in the vessel.

At 606, based at least in part upon the recipe data, one or more ingredients are received in the vessel. At 608, weight of the one or more ingredients received in the vessel is monitored based upon the integrated scale. At 610, feedback such as, for example, the weight, may be provided to a user of the mixing apparatus via a UI, e.g., the UI component 150, of the mixing apparatus. Additionally, other feedback or information, e.g., nutritional information, may also be provided to the user of the mixing apparatus via the UI, in addition to or instead of the weight.

At 612, based at least in part upon the recipe data, the UI provides to the user at least one of (1) recipe steps to follow as ingredients are received in the vessel or (2) instructions to operate the mixing apparatus. At 614, the vessel is moved such that (i) the vessel no longer engages the integrated scale and (ii) an agitator is operatively coupled to a motor included in the base. At 616, the motor is activated to drive the agitator.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A mixing apparatus comprising:
   a base comprising:
      an integrated scale comprising a load cell and a scale plate; and
      a motor;
   an agitator;
   a coupling unit comprising the agitator;
   a vessel, wherein the vessel is configured for (i) engagement with the integrated scale and (ii) operative coupling of the agitator with the motor wherein the vessel comprises a first end that includes an opening configured for coupling to the coupling unit, and a second end configured for engagement with the integrated scale;
   wherein the coupling unit is configured to engage the vessel with the base such that the motor is operatively coupled to the agitator, such that the coupling unit maintains a gap under the coupling unit and above the integrated scale, and such that the coupling unit does not contact the scale plate;
   a microcontroller;
   a user interface component that provides feedback from the integrated scale as ingredients are received in the vessel; and
   a memory, wherein the memory includes a recipe application stored therein and executable by the microcontroller to provide, via the user interface component, at least one of (1) recipe steps to follow as ingredients are received in the vessel or (2) instructions to operate the apparatus.

2. The mixing apparatus of claim 1, wherein the user interface component comprises at least one of an audio component, a visual component, or a combination of audio and visual components.

3. The mixing apparatus of claim 1, wherein the user interface component comprises a display mounted in the base and a graphical user interface presented on the display.

4. The mixing apparatus of claim 1, wherein the memory is included in the microcontroller.

5. The mixing apparatus of claim 1, wherein the microcontroller, the user interface component and the memory are located in the base.

6. The mixing apparatus of claim 1,
   wherein the coupling unit has coupling unit walls configured for maintaining the gap under the coupling unit and above all the integrated scale.

7. The mixing apparatus of claim 6,
   wherein the coupling unit walls extend a length sufficient for maintaining the gap under the coupling unit and above all the integrated scale.

8. The mixing apparatus of claim 7,
   wherein the base has a base wall configured for engaging with the coupling unit wall and configured for registering the coupling unit within the base.

9. A mixing apparatus comprising:
   a base with an integrated scale with a scale plate, the base with a motor coupled to a motor clutch plate;
   a vessel having an open end and an enclosed end;
   a coupling unit comprising an agitator coupled to a coupling clutch plate, wherein the coupling unit is configured for coupling to the open end of the vessel;
   wherein the enclosed end of the vessel is configured for engaging with the scale plate such that the vessel does not engage with the motor clutch plate; and wherein the coupling unit has a coupling unit wall configured for engaging with the base such that the coupling unit maintains a gap under the coupling unit and above the scale plate, such that the coupling unit does not contact the scale plate, and such that the coupling clutch plate engages with the motor clutch plate.

10. The mixing apparatus of claim 9,
wherein the scale plate surrounds the motor clutch plate.

11. The mixing apparatus of claim 9,
wherein the scale plate is configured for registering the enclosed end of the vessel.

12. The mixing apparatus of claim 9,
wherein the coupling unit wall extends a length sufficient for maintaining the gap under the coupling unit and above all the scale plate.

13. The mixing apparatus of claim 12,
wherein the base has a base wall configured for engaging with the coupling unit wall and configured for registering the coupling unit within the base.

14. The mixing apparatus of claim 9, further comprising:
a microcontroller;
a user interface component that provides feedback from the integrated scale as ingredients are received in the vessel; and
a memory, wherein the memory includes a recipe application stored therein and executable by the microcontroller to provide, via the user interface component, at least one of (1) recipe steps to follow as ingredients are received in the vessel or (2) instructions to operate the apparatus.

15. A mixing apparatus comprising:
a base with a base annular wall, an integrated scale with a scale plate positioned within the base annular wall, the base with a motor coupled to a motor clutch plate;
a vessel having a first open end and a second open end;
a coupling unit comprising an agitator coupled to a blender clutch plate, wherein the coupling unit is coupled to the first open end of the vessel;
wherein the coupling unit has a coupling unit annular wall configured to insert within the base annular wall;
wherein the coupling unit has a coupling unit key positioned in an interior space of the coupling unit annular wall, the coupling unit key configured for engaging with the scale plate when the coupling unit is within the base annular wall in a first rotational position in which the blender clutch plate does not engage the motor clutch plate; and
wherein the coupling unit is configured for rotating within the base annular wall relative to the base from the first rotational position until the coupling unit is in a second rotational position in which the coupling unit key no longer engages the scale plate and the coupling unit lowers down onto the base such that the blender clutch plate engages the motor clutch plate.

16. The mixing apparatus of claim 15,
wherein the coupling unit key comprises three, four, or more segments.

17. The mixing apparatus of claim 15, further comprising:
a microcontroller;
a user interface component that provides feedback from the integrated scale as ingredients are received in the vessel; and
a memory, wherein the memory includes a recipe application stored therein and executable by the microcontroller to provide, via the user interface component, at least one of (1) recipe steps to follow as ingredients are received in the vessel or (2) instructions to operate the mixing apparatus.

18. The mixing apparatus of claim 15,
wherein the key includes two separate portions that are located on two opposing sides of the interior space of the coupling unit annular wall; and
wherein the scale plate is longer in one dimension than in an orthogonal direction.

* * * * *